United States Patent [19]

Magnani

[11] Patent Number: 5,030,287

[45] Date of Patent: Jul. 9, 1991

[54] CEMENT MIX AND METHOD FOR PRODUCING REINFORCED BUILDING SHEETS FROM A CEMENT MIX

[75] Inventor: Silvio Magnani, Canneto Pavese, Italy

[73] Assignee: Fibronit S.r.l., Casale Monferrato, Italy

[21] Appl. No.: 381,311

[22] Filed: Jul. 18, 1989

[30] Foreign Application Priority Data

Jul. 18, 1988 [IT] Italy .............................. 21403 A/88

[51] Int. Cl.[5] .......................... C04B 22/00; C04B 7/02

[52] U.S. Cl. .................................... 106/754; 106/770; 106/771; 106/753

[58] Field of Search ..................... 106/85, 100, 99, 90, 106/88, 739, 748, 756, 703, 713, 770, 754, 753; 404/17-18

[56] References Cited

U.S. PATENT DOCUMENTS

| | | | |
|---|---|---|---|
| 915,774 | 3/1909 | Keller | 106/85 |
| 1,135,176 | 4/1915 | Gossett | 106/85 |
| 1,505,642 | 8/1924 | Henry | 404/18 |
| 1,507,379 | 9/1924 | Hoskins | 106/85 |
| 1,556,115 | 10/1925 | Hoskins | 106/85 |
| 2,014,826 | 9/1935 | Wildrick | 404/17 |
| 2,238,540 | 4/1941 | Sourwine | 106/85 |
| 2,880,101 | 3/1959 | Ulfstedt | 106/88 |
| 3,025,772 | 3/1962 | Palatini | 404/18 |
| 3,151,995 | 10/1964 | Nemeth | 106/85 |
| 3,202,320 | 8/1965 | Enoch | 106/85 |
| 3,238,682 | 3/1966 | Tracy | 404/18 |
| 3,597,249 | 8/1971 | Shannon | 106/85 |
| 3,687,800 | 8/1972 | Scheppers . | |
| 3,870,422 | 3/1975 | Medico | 404/17 |
| 4,124,405 | 11/1978 | Quiénot | 106/85 |
| 4,212,680 | 7/1980 | Schulz | 106/85 |
| 4,235,291 | 11/1980 | Messenger | 106/85 |
| 4,314,853 | 2/1982 | Moens | 106/100 |
| 4,504,335 | 3/1985 | Galer . | |

FOREIGN PATENT DOCUMENTS

| | | | |
|---|---|---|---|
| 884926 | 11/1971 | Canada | 106/88 |
| 0021362 | 1/1981 | European Pat. Off. . | |
| 0067456 | 12/1982 | European Pat. Off. . | |
| 0095943 | 12/1983 | European Pat. Off. . | |
| 0173873 | 3/1986 | European Pat. Off. . | |
| 0192208 | 8/1986 | European Pat. Off. . | |
| 0643627 | 6/1984 | Fed. Rep. of Germany | 404/17 |
| 2546927 | 7/1984 | France | 404/17 |
| 447541 | 5/1936 | United Kingdom . | |
| 778064 | 7/1957 | United Kingdom | 106/85 |
| 793992 | 4/1958 | United Kingdom | 106/85 |
| 1188106 | 4/1970 | United Kingdom | 106/85 |
| 8301410 | 4/1983 | World Int. Prop. O. . | |

OTHER PUBLICATIONS

*Concrete Admixtures Handbook* v.s. Ramachandran (1984) Noyes Publications, Park Ridge, NJ; pp. 213, 507, 484, 349, 128, 164, 237, 244, 249, 587, 399, 436, 512, 518, 519, 520, 345, 594.

*Design and Control of Concrete Mixtures* Thirteenth Ed. S. Kasmatka and W. Panarese pp. 1, 90–91, 80, 64–65, 192–193.

"Portland Cement Today and Twenty Years Ago" by P. H. Bates, *Engineering News-Record* pp. 492–493 published Apr. 20, 1933.

*Primary Examiner*—William R. Dixon, Jr.
*Assistant Examiner*—Paul Marcantoni

[57] ABSTRACT

A method for producing building sheets containing cement, inert materials and additives and reinforced with plastic mesh, starting from a cement mix which does not contain more water than that desired in the formed sheet prior to hardening, the necessary fluidity of the cement mix being obtained by adding a fluidiser. The apparatus and method are therefore simplified.

7 Claims, 1 Drawing Sheet

CEMENT MIX AND METHOD FOR PRODUCING REINFORCED BUILDING SHEETS FROM A CEMENT MIX

FIELD OF THE INVENTION

The present invention relates to cement building sheets reinforced with plastic mesh.

PRIOR ART

Building sheets containing cement, inert materials and additives and reinforced with plastic mesh are produced by known methods consisting of impregnating one or more layers of said mesh with a mix comprising cement, sand, water and possibly additives.

Such sheets are produced particularly as a replacement for asbestos-cement sheets which can pollute the environment or produce occupational diseases.

For example, a know method for producing said sheets consists of conveying the sheets under formation on an endless flat porous conveyor belt advancing horizontally with a uniform motion, laying a continuous mesh on said belt so that it is conveyed thereby, pouring or spraying a mix of cement, sand, water and possibly additives onto the mesh and then smoothing the surface of the poured material. The operation can be repeated by depositing a further mesh on the first formed layer and pouring or spraying a further quantity of mixture and so on until the required thickness is obtained. To obtain good mesh impregnation and give the mix the fluidity characteristics necessary to allow the distributors to operate properly, the water content of the mix must be greater than the quantity desirable in the sheet before its hardening. This water content is normally not less than 40% by weight of the cement.

Consequently after formation, the conveyor belt with the overlying manufactured sheet is passed through suction boxes which remove the excess water until a residual water content of 27–32% by weight of the cement is obtained.

In another known method the mesh is impregnated by pouring a layer of mix containing cement, sand, water and other additives onto an endless flat porous conveyor belt advancing with uniform movement, laying a reinforcement mesh on said layer and incorporating said mesh into the mix by the action of rammers. In this case the mix must again contain a higher percentage of water than that which is desirable in the formed sheet before its hardening, and this excess water must therefore be removed during or after formation by suction boxes and vacuum pumps or by compression. Methods such as those schematically described above are indeed used for the industrial production of sheets reinforced with plastic mesh, but have the drawback that the cost involved in removing the excess water is high. In this respect, the cost of the energy for operating the vacuum pumps must be added to the cost of the continuous washing and frequent replacement of the porous conveyor belts (felt or cloth) and the cost of the frequent cleaning of the suction boxes, which tend to become clogged with sand and cement.

It is also very costly to clarify the process water used for washing the conveyor belt, it being insufficient to use decanter cones as the amount of turbid water which can be used for preparing the mix, since a proportion of the water quantity required for said washing, is very small.

A further known method for producing cement sheets reinforced with plastic mesh uses as conveyor element for the forming sheet and a porous belt on which a continuous plastics mesh is deposited, with the cement, sand and possible additives in the form of a dry powdery mixture being then poured onto said mesh. Wetting is then done performed by spraying, and underlying suction boxes are utilized to draw through the pores of the conveyor element in order to obtain the speedy absorption by the entire layer.

Again there is a high cost involved in operating the vacuum pumps, the continuous washing and periodical replacement of the porous conveyor element (felt or cloth), plus the cleaning of the suction boxes and the wash water decantation.

SUMMARY OF THE INVENTION

A method has now been discovered which allows building sheets containing cement, inert materials and additives and reinforced with plastics mesh to be produced using a mix containing no more water than that desired to be present in the formed sheet before its hardening.

By this means the apparatus for producing said sheets is considerably simplified and the production costs are reduced in that the operations involved in removing the excess water of present in the known prior art processes are avoided.

The apparatus of the present invention comprises a conveyor belt provided with a support, drive and inversion means, a feeder for a continuous web and a series of feeders for the mesh and cement mix. The conveyor belt is of the impermeable type and said web constitutes the support for the sheet under formation.

The method of the present invention is characterised by:

(a) preparing a cement mix comprising cement, inert materials, additives, water in a quantity of between 20% and 32% by weight of the cement, and a fluidiser;

(b) laying a continuous support web for the sheet under formation on an impermeable conveyor belt which advances horizontally with uniform speed to convey said web;

(c) laying on said web a plastics mesh which advances simultaneously with said belt and said web;

(d) depositing a layer of said cement mix on said mesh and smoothing;

(e) laying further meshes, each with its layer of cement mix, until the desired sheet thickness is obtained;

(f) possibly compressing the sheet under formation;

(g) possibly applying a granular coating;

(h) conveying the formed sheet with its support web to the trimming, transverse cutting, corrugation and stacking operations.

In a modified embodiment, the succession of materials deposited on the support web can start with the deposition not of a plastic mesh but of a layer of cement mix without the method being altered. In addition a light layer of powdered cement can be scattered over each cement mix-impregnated mesh either before or after smoothing, to improve the sheet consistency.

BRIEF DESCRIPTION OF THE DRAWINGS

The characteristics and advantages of the present invention will be more apparent from the detailed description given hereinafter with reference to the accompanying drawings wherein.

DETAILED DESCRIPTION OF THE INVENTION

Figure 1:
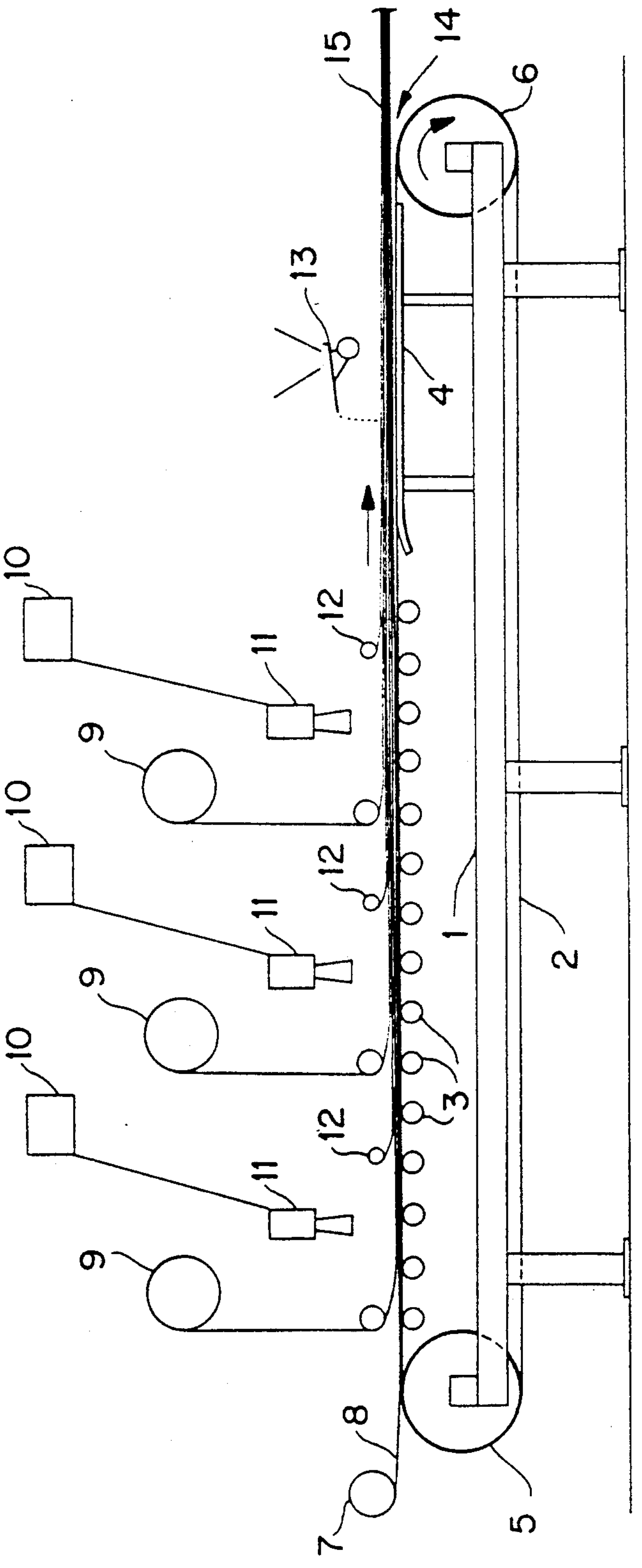
FIG. 1 shows the apparatus for producing building sheets according to the present invention.

With reference to the reference numerals shown in the FIGURE, the apparatus consists of a frame 1, a conveyor belt 2, support rollers 3 and a slide surface 4 for said conveyor belt 2, an inversion roller 5 and a drive roller 6, a feeder 7 for a continuous support web 8, a series of mesh feeders 9, a series of cement mix metering pumps 10, a series of cement mix distributors 11 and smoothing devices 12.

The conveyor belt 2 is of an impermeable material such as rubber or rubber-coated or plastic-coated cloth.

The continuous support web 8 is a thin flexible web of sufficiently resistant paper or plastics material, preferably polyethylene, having a width equal to the width of the sheet to be produced.

The pumps 10 withdraw the cement mix from a mixer not shown in the FIGURE, into which the various raw materials, comprising water in the correct quantity, are metered and then mixed together by known means. A granular coating can also be applied to the sheet by means of the distributor 13, in the known manner.

The cement mix according to the present invention has the following solids composition:

Portland cement 50–85% by weight, inert materials 10–50% by weight and additives 0–15% by weight, and in addition 20–32% by weight of water with respect to the cement and 0.5–2.0% by weight of a fluidiser with respect to the cement.

Lime, pozzuolana, white binder or gypsum can be used as an alternative to the portland cement. The inert material is generally sand.

Suitable solid additives are, for example, colored oxides, colloidal silicas, waterproofing agents, fibers, resins, lightening materials etc.

The fluidiser is an anionic dispersant with dispering and fluidising characteristics.

The mesh used in the present invention is preferably that obtained by the fibrillation of a thermoplastic film, preferably polypropylene. However, is mesh formed of thermoplastic polymer filaments can also be used.

In the method for preparing sheets according to the present invention, the conveyor belt 2 moves at uniform speed in the direction of the arrow. On its upper surface there rests, to be conveyed rigidly with it, the web 8 on which the sheet 15 is to be continuously formed.

The first mesh unwinding from the first feeder 9 is firstly laid on said web 8 and conveyed thereon while the cement mix is distributed by the first distributor 11 to form a first layer, which is smoothed on its surface by the relative flexible blade 12.

The described operations are repeated in subsequent sheet forming stations, ie laying the mesh, distributing the mix and smoothing forming superposing successive layers, until the desired thickness is reached.

As an alternative to the described method, in forming the individual layers it is possible to firstly distribute the cement mix and then lay the mesh. It is also possible during formation to increase the sheet consistency by sprinkling a light layer of powdered cement onto each mesh after its impregnation with cement mix and either before or after smoothing.

When forming is complete, compression treatment can follow for example by means of an idle or suitably driven roller, followed by finishing by the application of a surface granular layer utilizing the distributor 13.

At the point indicated by 14 the web 8 supporting the sheet 15 separates from the conveyor belt 2 to transfer the sheet 15 to trimming, transverse cutting, corrugation, stamping ect. and then to stacking.

The purpose of the web 8 is therefore to support the forming sheet 15 at its separation point 14 and through all the subsequent operations.

In addition to acting as a support, it prevents the surface particles of the cement mix from adhering to the conveyor belt 2 at the separation point 14 with consequent deterioration of the lower surface of the sheet. Moreover, by accompanying the not yet hard sheet through its various subsequent handling movements it reduces the risk of cracking. Finally it prevents the sheet from adhering to the underlying still fresh sheet when stacked.

From the aforegoing description it is apparent that the invention attains all the stated objects and in particular enables a cement mix to be used which does not contain more water than that contained in the formed sheet prior to hardening, thus resulting in a simplified apparatus without the use of suction boxes and relative vacuum pumps.

I claim:

1. A method for producing building sheets reinforced with plastic mesh consisting essentially of cement and sand reinforced with plastic mesh, which comprises:

(a) preparing a cement mix having the following solids composition: Portland cement in an amount of 50–85% by weight, sand in an amount of 10–50% by weight and in addition containing 20–32% by weight of water with respect to the cement and 0.5–2.0% by weight of an anionic dispersant with respect to the cement;

(b) laying a continuous substantially rigid support web for the sheet under formation on an impermeable conveyor belt which advances horizontally with uniform speed to convey said web;

(c) laying on said web a plastic mesh which advances simultaneously with said belt and said web;

(d) depositing a layer of said cement mix on said mesh followed by smoothing said layer;

(e) adding further layers of plastic mesh, each being followed with its layer of cement mix, until the desired sheet thickness is obtained; and (f) conveying the formed sheet with its support web to the subsequent operations of trimming, transverse cutting, corrugation and stacking.

2. The method as claimed in claim 1, wherein a light layer of powdered cement is scattered over each mesh after depositing the cement mix and before or after the smoothing operation.

3. The method as claimed in claim 1 wherein said mesh is formed of filaments of polyethylene.

4. A method for producing building sheets reinforced with plastic mesh consisting essentially of cement and sand reinforced with plastic mesh, which comprises the steps of:

(a) preparing a cement mix having the following solids composition: Portland cement in an amount of 50–85% by weight, sand in an amount of 10–50% by weight and in addition containing 20–32% by weight of water with respect to the cement and 0.5–2.0% by weight of an anionic dispersant with respect to the cement;

(b) laying a continuous substantially rigid support web for the sheet under formation on an impermeable conveyor belt which advances horizontally with uniform speed to convey said web;

(c) despositing a layer of said cement mix on said web followed by smoothing said layer;

(d) laying in said plastic mesh which advances simultaneously with said belt and said web;

(e) adding further layers of said cement mix, each being followed with its layer of plastic mesh, until the desired sheet thickness is obtained; and (f) conveying the formed sheet with its support web to the subsequent operations of trimming, transverse cutting, corrugation and stacking.

5. The method as claimed in claim 4 wherein said mesh is formed of filaments of polyethylene.

6. A method for producing building sheets reinforced with plastic mesh consisting essentially of cement and sand reinforced with plastic mesh, which consists of:

(a) preparing a cement mix having the following solids composition: Portland cement in an amount of 50–85% by weight, sand in an amount of 10–50% by weight and in addition containing 20–32% by weight of water with respect to the cement and 0.5–2.0% by weight of an anionic dispersant with respect to the cement;

(b) laying a continuous substantially rigid support web for the sheet under formation on an impermeable conveyor belt which advances horizontally with uniform speed to convey said web;

(c) laying on said web a plastic mesh which advances simultaneously with said belt and said web;

(d) depositing a layer of said cement mix on said mesh followed by smoothing said layer;

(e) adding further layers of plastic mesh, each being followed with its layer of cement mix, until the desired sheet thickness is obtained; and (f) conveying the formed sheet consisting of layers of plastic mesh and layers of cement mix with its support web to the subsequent operations of trimming, transverse cutting, corrugation and stacking.

7. The method as claimed in claim 6 wherein said mesh is formed of filaments of polyethylene.

* * * * *